US012644425B2

(12) United States Patent
Wilhelmsson et al.

(10) Patent No.: US 12,644,425 B2
(45) Date of Patent: Jun. 2, 2026

(54) METHOD AND A SYSTEM FOR CONTROLLING A VEHICLE COMPRISING AN ENGINE EXHAUST SYSTEM

(71) Applicant: VOLVO TRUCK CORPORATION, Gothenburg (SE)

(72) Inventors: Martin Wilhelmsson, Torslanda (SE); Mattias Johansson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 351 days.

(21) Appl. No.: 18/441,768

(22) Filed: Feb. 14, 2024

(65) Prior Publication Data

US 2024/0271585 A1 Aug. 15, 2024

(30) Foreign Application Priority Data

Feb. 15, 2023 (EP) .................................... 23156924

(51) Int. Cl.

*F02D 43/04* (2006.01)
*F01N 11/00* (2006.01)
*F01N 9/00* (2006.01)

(52) U.S. Cl.

CPC ............ *F02D 43/04* (2013.01); *F01N 11/002* (2013.01); *F01N 9/007* (2013.01); *F01N 2560/07* (2013.01);

(Continued)

(58) Field of Classification Search

CPC .. F01N 9/002; F01N 3/023; F01N 2900/1602; F01N 2900/1606;

(Continued)

(56) References Cited

U.S. PATENT DOCUMENTS 9,217,345 B2 * 12/2015 Ukropec ................ F01N 3/023
2009/0182479 A1 7/2009 Daneau et al.

(Continued)

FOREIGN PATENT DOCUMENTS

| | | | |
|---|---|---|---|
| DE | 202015000385 U1 | 4/2016 |
| DE | 102017006501 A1 | 1/2019 |
| GB | 2557624 A | 6/2018 |

OTHER PUBLICATIONS

Extended European Search Report, European Patent Application No. 23156924.5, mailed Aug. 22, 2023, 8 pages.

*Primary Examiner* — John Kwon
(74) *Attorney, Agent, or Firm* — Sage Patent Group

(57) ABSTRACT

A computer-implemented method for controlling a vehicle comprising a combustion engine, drive members, and an engine exhaust system comprising a particulate filter, the method comprising: determining that a first condition is fulfilled, such as when a downhill condition applies, determining if a second condition is fulfilled, wherein the second condition is considered fulfilled if an amount of soot in the particulate filter exceeds a threshold amount, and/or if a temperature at the particulate filter exceeds a temperature threshold level, in response to determining that the first condition is fulfilled, and the second condition is not fulfilled, controlling the vehicle to turn off the combustion engine, in response to determining that the first and second conditions are fulfilled, controlling the vehicle to supply fuel to the combustion engine, the engine being drivingly disconnected from the drive members.

15 Claims, 5 Drawing Sheets

(52) U.S. Cl.
CPC .. *F01N 2560/08* (2013.01); *F01N 2900/1602* (2013.01); *F01N 2900/1606* (2013.01)

(58) Field of Classification Search
CPC ........... F01N 2900/1611; F02D 41/024; F02D 41/123; F02D 2200/0812
See application file for complete search history.

(56) References Cited

U.S. PATENT DOCUMENTS

| | | | | |
|---|---|---|---|---|
| 2011/0073070 | A1* | 3/2011 | Ruhland | F02D 37/02<br>123/406.19 |
| 2011/0073088 | A1* | 3/2011 | Hubbard | F01N 3/021<br>123/703 |
| 2019/0032585 | A1* | 1/2019 | Kelly | F02D 41/029 |
| 2019/0078478 | A1* | 3/2019 | Martin | F02M 26/15 |
| 2020/0191079 | A1* | 6/2020 | Schwaab | F02D 41/024 |
| 2021/0079860 | A1* | 3/2021 | Yokoyama | F02D 41/029 |

* cited by examiner

METHOD AND A SYSTEM FOR CONTROLLING A VEHICLE COMPRISING AN ENGINE EXHAUST SYSTEM

CROSS REFERENCE TO RELATED APPLICATIONS

This application claims foreign priority to European Patent Application No. 23156924.5, filed on Feb. 15, 2023, the disclosure and content of which is incorporated by reference herein in its entirety.

TECHNICAL FIELD

The disclosure relates generally to vehicle control. In particular aspects, the disclosure relates to a method and a system for controlling a vehicle comprising an engine exhaust system. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Heavy-duty vehicles powered by combustion engines are generally provided with aftertreatment systems including diesel particulate filters that collect soot and ash from the combustion engines and reduce particle emissions. The soot mainly consists of carbon, originating from non-combusted fuel or oil from the engine.

If the filter becomes full, there is a risk of soot ignition if at the same time a temperature at the filter is elevated. During a soot ignition, the soot is ignited and reacts with the oxygen in the exhaust gases, which creates a lot of heat energy. The heat energy may damage the filter, and/or surrounding components within the aftertreatment system.

SUMMARY

According to a first aspect of the disclosure, a computer system comprising a processor device configured to control a vehicle is provided. The vehicle comprises a combustion engine, at least one pair of drive members drivingly connectable to the combustion engine for driving the vehicle, and an engine exhaust system comprising a particulate filter, the processor device being configured to:

- determine that a first condition is fulfilled, wherein the first condition is fulfilled at least when a downhill condition applies or is about to apply,
- determine if a second condition is fulfilled, wherein the second condition is considered fulfilled if an amount of soot in the particulate filter is determined to exceed a threshold amount, and/or if a temperature at the particulate filter is determined to exceed a temperature threshold level,
- in response to determining that the first condition is fulfilled and that the second condition is not fulfilled, control the vehicle to a first operational mode in which the combustion engine is turned off,
- in response to determining that the first condition is fulfilled and that the second condition is fulfilled, control the vehicle to a second operational mode in which fuel is supplied to the combustion engine and in which the combustion engine is drivingly disconnected from the at least one pair of drive members.

According to a second aspect of the disclosure, a computer-implemented method for controlling a vehicle comprising a combustion engine, at least one pair of drive members drivingly connectable to the combustion engine for driving the vehicle, and an engine exhaust system comprising a particulate filter is provided. The method comprises:

- determining, by a processor device of a computer system, that a first condition is fulfilled, wherein the first condition is fulfilled at least when a downhill condition applies or is about to apply,
- determining, by the processor device, if a second condition is fulfilled, wherein the second condition is considered fulfilled if an amount of soot in the particulate filter is determined to exceed a threshold amount, and/or if a temperature at the particulate filter is determined to exceed a temperature threshold level,
- in response to determining that the first condition is fulfilled and that the second condition is not fulfilled, controlling, by the processor device, the vehicle to a first operational mode in which the combustion engine is turned off,
- in response to determining that the first condition is fulfilled and that the second condition is fulfilled, controlling, by the processor device, the vehicle to a second operational mode in which fuel is supplied to the combustion engine and in which the combustion engine is drivingly disconnected from the at least one pair of drive members.

The first and second aspects of the disclosure may seek to provide an in at least some aspect improved computer system and an in at least some aspect improved method, respectively, for controlling a vehicle equipped with a combustion engine and an engine exhaust system comprising a particulate filter. A technical benefit of the computer system as well as of the method may include a reduced risk of soot ignition within the particulate filter. This can be achieved thanks to the action taken in response to determining that the first condition is fulfilled, such as that the downhill condition applies, and that the second condition is also fulfilled, i.e., that the amount of soot exceeds the threshold amount, and/or that the temperature exceeds the temperature threshold level. In these cases, the combustion engine remains turned on, i.e., fuel is supplied to the engine, but it is drivingly disconnected from the drive members, such as by applying a neutral gear or by using a clutch to disconnect the combustion engine. Exhaust gas is thereby produced by the combustion engine and guided to the hot and/or clogged particulate filter while the vehicle is travelling downhill. The exhaust gas mass flow is thereby able to cool the particulate filter and thereby reduce the risk of soot ignition.

According to the present disclosure, the first condition is considered fulfilled when the downhill condition applies or is about to apply. In some examples, the first condition may furthermore be considered fulfilled when an overspeed condition applies, i.e., when the vehicle is travelling at a speed which is higher than a defined vehicle speed, such as a vehicle speed limit or a target vehicle speed.

It may be determined that a downhill condition applies when it is detected that the vehicle is travelling downhill. It may be determined that a downhill condition is about to apply when the vehicle is just about to enter a downhill road section, such as when the vehicle is at a crest of a hill, or just before the crest. In some examples, it may be determined that the downhill condition is about to apply when a downhill road section is detected and it is determined that the vehicle is expected to be able to enter the downhill road section without additional torque provided by the engine.

In some examples, including in at least one preferred example, optionally, in the second operational mode, the combustion engine and/or the engine exhaust system is/are controlled to obtain a cooling of the particulate filter by an exhaust gas flow from the combustion engine. A technical benefit may include an efficient prevention of soot ignition within the particulate filter.

In some examples, including in at least one preferred example, optionally, in the second operational mode, the combustion engine is controlled to generate a mass flow of exhaust gas at or above a defined minimum mass flow level. A technical benefit may include that a mass flow level that leads to an efficient cooling of the particulate filter can be ensured. The minimum mass flow level may be set in advance, or it may be set in dependence on operating parameters of the vehicle and/or of the engine and/or of the engine exhaust system. For example, the temperature at the particulate filter may be taken into account for setting a minimum mass flow level.

In some examples, including in at least one preferred example, optionally, the method further comprises, in the processor device, receiving pressure data from at least one pressure sensor configured to measure a pressure within the engine exhaust system, said pressure data being indicative of a pressure upstream and/or downstream of the particulate filter. A technical benefit may include that an accurate determination of the amount of soot present in the particulate filter can be made. The pressure data should for this purpose preferably be indicative of a differential pressure over the particulate filter or allow determination of the differential pressure. A threshold differential pressure may be defined, above which the amount of soot may be determined to exceed the threshold amount.

In some examples, including in at least one preferred example, optionally, determining if the amount of soot exceeds the threshold amount comprises using the received pressure data. Alternatively, or additionally, the amount of soot in the particulate filter may be modelled in the processor device using a theoretical model. Typically, the received pressure data may be used together with such a theoretical model.

In some examples, including in at least one preferred example, optionally, the method further comprises, in the processor device, receiving temperature data from at least one temperature sensor configured to measure a temperature within the engine exhaust system, said temperature data being indicative of a temperature of the particulate filter. A technical benefit may include that an accurate determination of the temperature at the particulate filter can be made.

In some examples, including in at least one preferred example, optionally, determining if the temperature at the particulate filter exceeds the temperature threshold level comprises using the received temperature data. The temperature data may either be used directly by comparing the received temperature data to the temperature threshold level, or by predicting the expected temperature at the start of the downhill condition by, e.g., extrapolating a temperature curve, or by using map data and position information. A technical benefit may include that it can be accurately determined whether the temperature exceeds the temperature threshold level.

In some examples, including in at least one preferred example, optionally, determining that the downhill condition applies or is about to apply comprises using map data and position information indicative of a current geographic position of the vehicle, such as received from a route planning device of the vehicle. The downhill condition can alternatively be determined based on the position information and historical data, such as when the vehicle is travelling along a known route that it has travelled before. Furthermore, when the vehicle is travelling downhill, the downhill condition may alternatively or as a complement be determined based on inclination data collected by one or more sensors of the vehicle.

In some examples, including in at least one preferred example, optionally, the second condition is only considered fulfilled when the amount of soot in the particulate filter is determined to exceed the threshold amount, and when the temperature at the particulate filter is determined to exceed the temperature threshold level. Hence, if the amount of soot is below the threshold amount, the second condition is in these examples not considered fulfilled even if the temperature exceeds the temperature threshold level, and vice versa.

In some examples, including in at least one preferred example, optionally, the first condition is considered fulfilled when a vehicle overspeed condition of the vehicle applies. Hence, the method may be used on flat or relatively flat road sections where the downhill road condition does not apply. The overspeed condition applies when the vehicle is travelling at a speed which is higher than a defined vehicle speed, such as an actual set speed, e.g., a vehicle speed limit. The vehicle may in those examples be travelling with a "Pulse-and-Glide" strategy active. This means that the vehicle is accelerated to a predetermined set speed during a pulse phase, typically 2-3 km/h above the actual set speed, whereafter the engine is turned off and drivingly disconnected, and the vehicle is allowed to decelerate to 2-3 km/h below the actual set speed during a glide phase. If the amount of soot exceeds the threshold amount, and/or if the temperature exceeds the threshold level, the engine may remain turned on, and if not, it may be shut off. This may help in protecting the particulate filter from soot ignition when using the Pulse-and-Glide strategy, e.g., if the soot level is high and the particulate filter temperature is high before turning off the engine.

In the first operational mode, the combustion engine may be drivingly disconnected from the at least one pair of drive members. Hence, the vehicle is able to glide down the hill.

According to a third aspect of the disclosure, a vehicle comprising the processor device configured to perform the method according to the second aspect is provided.

In some examples, including in at least one preferred example, optionally, the vehicle is a heavy-duty vehicle such as a truck, a bus, or a construction machine.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings. The drawings are schematic and not drawn to scale.

DETAILED DESCRIPTION

The detailed description set forth below provides information and examples of the disclosed technology with sufficient detail to enable those skilled in the art to practice the disclosure.

Figure 1:
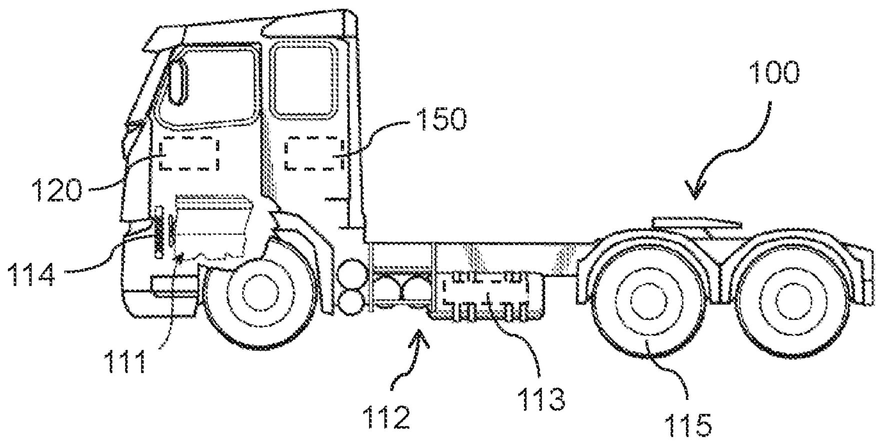
FIG. 1 is a side view of a vehicle according to an example.
Figure 2:
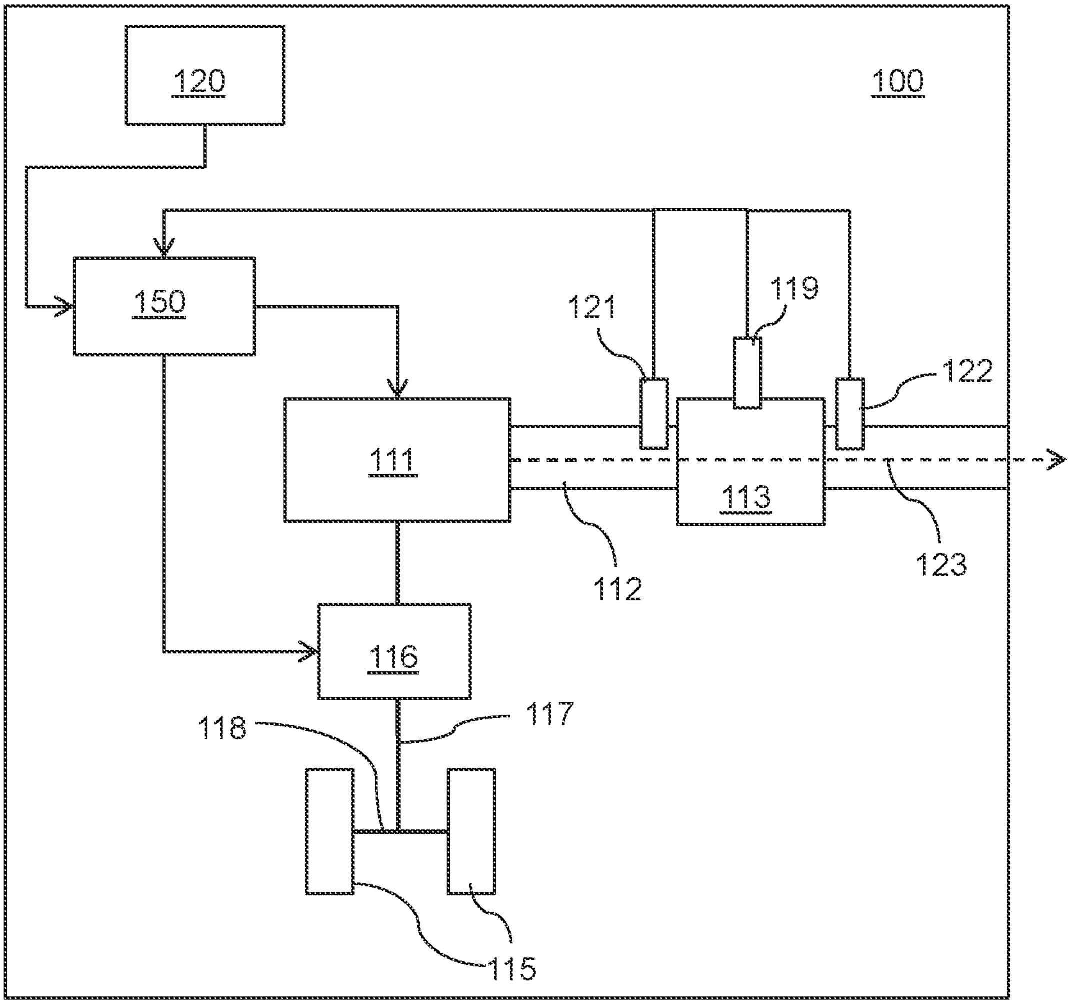
FIG. 2 schematically illustrates components of the vehicle in FIG. 1.

FIG. 1 is a side view of a vehicle 100 in which a method according to examples of the disclosure may be carried out. The vehicle 100 in FIG. 1 is a truck, or more specifically a tractor truck for towing one or more trailers (not shown). Reference is also made to FIG. 2, schematically illustrating parts of the vehicle 100.

The vehicle 100 includes an internal combustion engine 111 for propulsion of the vehicle 100, and at least one pair of drive members 115 drivingly connectable to the combustion engine 111 via a transmission arrangement 116, a propeller shaft 117 and a driven axle 118 for driving the vehicle 100. The pair of drive members 115 is in FIG. 1 a pair of wheels, although in other examples the vehicle may be provided with continuous tracks. The vehicle 100 further comprises an engine exhaust system 112 for guiding and handling an exhaust gas flow 123 generated by the internal combustion engine 111. The engine exhaust system 112, sometimes also referred to as an exhaust aftertreatment system (EATS) comprises a particulate filter 113 configured to collect soot and ash generated by the combustion engine 111. The engine exhaust system 112 may further comprise several different aftertreatment components (not shown), such as catalyst substrate(s), and sensors. In the illustrated example in FIG. 2, the engine exhaust system 112 comprises a temperature sensor 119 arranged for sensing a temperature of the particulate filter 113, and first and second pressure sensors 121, 122 arranged upstream and downstream of the particulate filter 113, respectively. Emission sensor(s), e.g., a nitrogen oxide (NOx) sensor (not shown) may further be provided.

The vehicle 100 is herein also equipped with a navigation system comprising a satellite navigation device 120 configured to detect and communicate a geographic position of the vehicle 100, such as coordinates of the vehicle 100. The vehicle 100 is further equipped with a control system comprising one or more electronic control units 150, also referred to as one or more processor devices, which will be described in further detail with reference to FIG. 6. The control system may be configured to control an operational mode of the vehicle 100 and may for this purpose be arranged to control the engine 111 and the transmission 116. The electronic control unit 150 may be configured to communicate with the sensors 119, 121, 122 and receive temperature and pressure data therefrom, and further to receive data from the navigation system comprising the satellite navigation device 120.

Even though the vehicle 100 is exemplified as solely powered by a combustion engine 111, the vehicle 100 may alternatively be a part electric vehicle, which partly uses electric power for propulsion, such as a hybrid vehicle comprising an internal combustion engine and one or more electric motors for propulsion. Even though the depicted vehicle 100 is a truck, it shall be noted that the vehicle 100 may be any type of vehicle, such as a bus, a working machine, etc.

Figure 3:
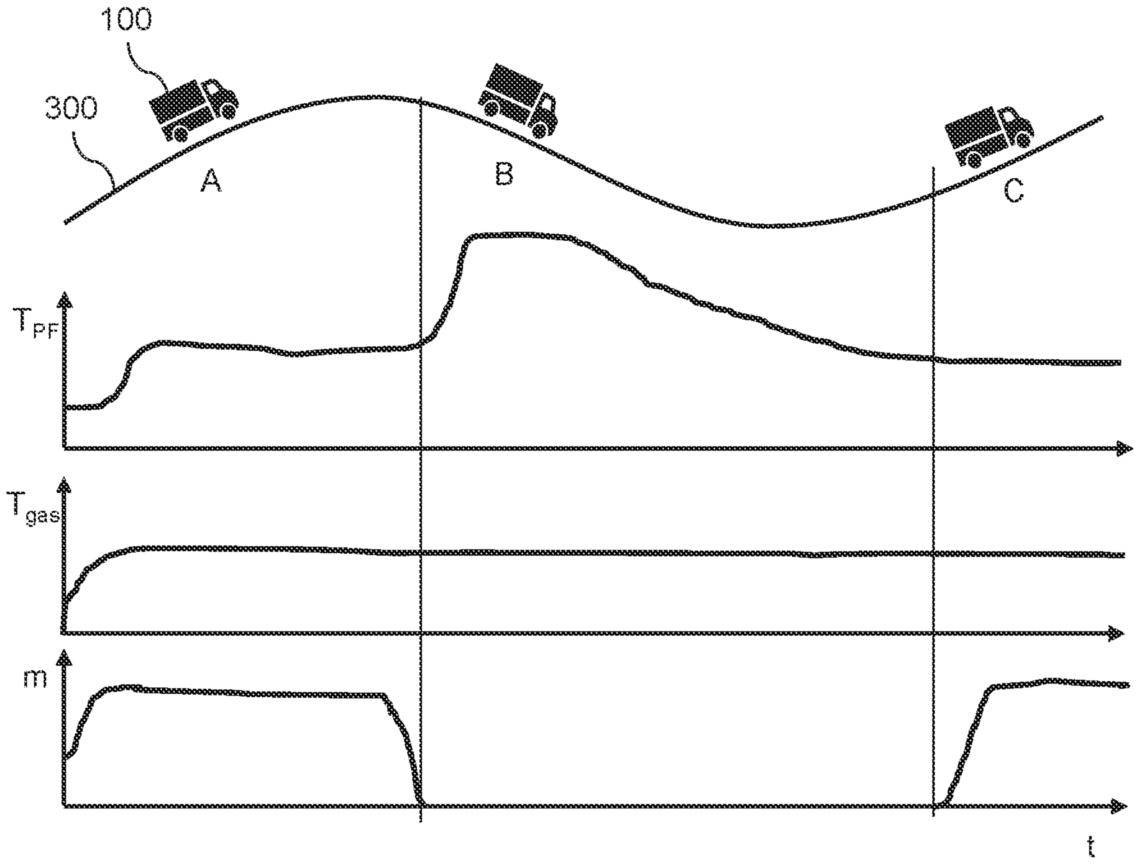
FIG. 3 is a diagram illustrating a driving scenario in which a soot ignition occurs.

FIG. 3 illustrates a vehicle 100, such as the vehicle illustrated in FIG. 1, travelling along a road 300 comprising a first uphill road section A, a downhill road section B, and a second uphill road section C. FIG. 3 further illustrates a temperature $T_{PF}$ of the particulate filter 113, a temperature $T_{gas}$ of the exhaust gases from the engine 111, and a mass flow m of exhaust gases from the engine 111, as a function of time t during travel along the road 300.

When the vehicle 100 is travelling along the first uphill road section A, the engine 111 works at a high load, leading to an elevated temperature of the engine exhaust system 112 and of the particulate filter 113. When the vehicle 100 enters the downhill road section B, and gravity is providing sufficient acceleration to keep sufficient vehicle speed, it is possible to put the transmission 116 in a neutral position, disconnecting the engine 111 from the pair of drive members 115, and turn off the engine 111. By turning off the engine 111 when it is not needed for propulsion during regular driving, it is possible to save fuel. It is further possible to avoid lowering a temperature of the engine exhaust system 112, which enables higher fuel efficiency and better emission conversion performance. Hence, it is usually desired to maintain a working temperature of the engine exhaust system 112 to avoid deteriorated emission control. If the amount of soot within the particulate filter 113 is at a relatively low level, there is generally no risk for soot ignition associated with this.

However, in the scenario illustrated in FIG. 3, the particulate filter 113 is loaded with soot. In this case, there is a risk that the elevated filter temperatures $T_{PF}$ reached during the first uphill road section A will lead to a soot ignition as the vehicle 100 turns off the engine 111 when entering the downhill road section B and the exhaust gas flow through the particulate filter 113 is consequently cut off. During a soot ignition, the soot is ignited and reacts with the oxygen in the exhaust gases from the engine 111, which creates a lot of heat energy. The particulate filter temperature $T_{PF}$ rapidly increases, which may damage the particulate filter 113, and/or surrounding components within the engine exhaust system 112. It is therefore desirable to avoid high temperature conditions that may lead to soot ignition.

Figure 4:
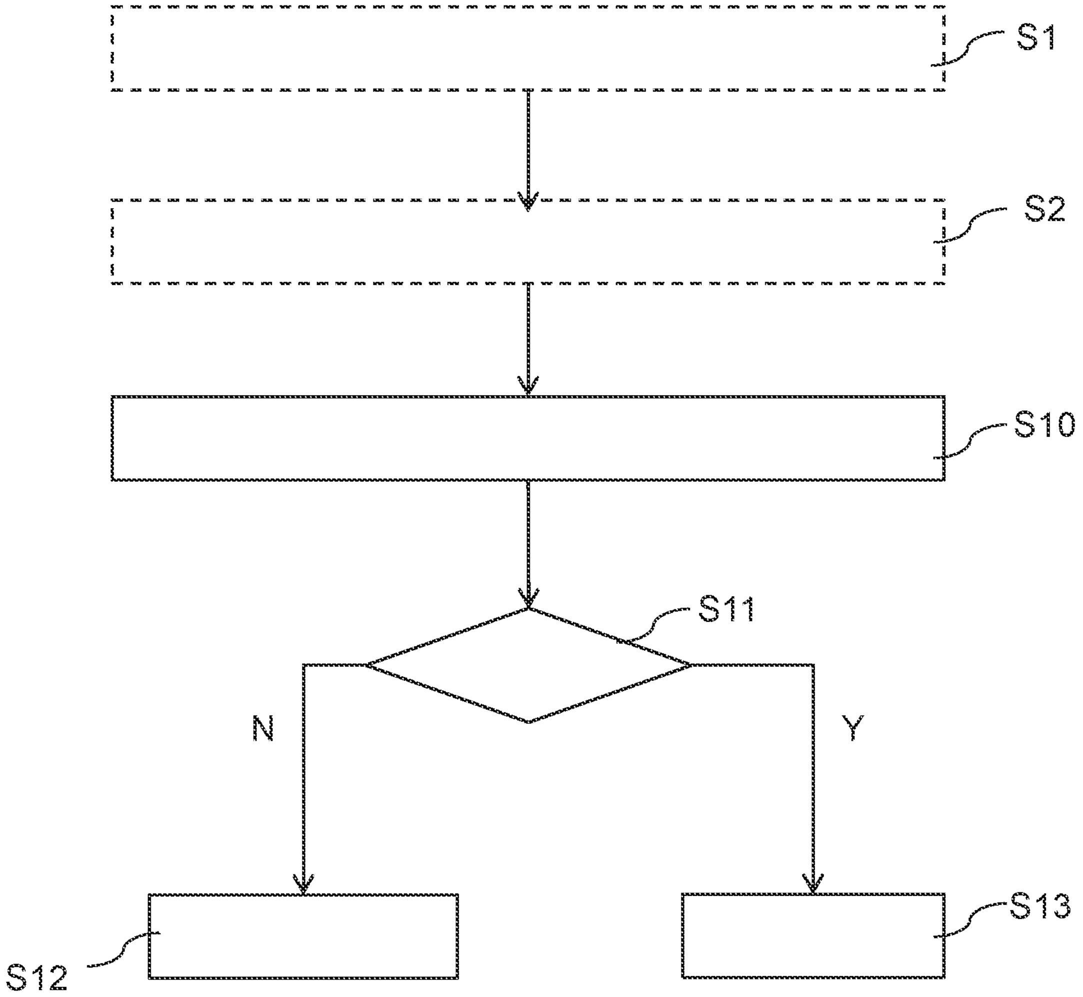
FIG. 4 is a flow chart of an exemplary method to control a vehicle according to an example.

A method for controlling the vehicle 100 according to examples of the present disclosure is illustrated in FIG. 4. The method may be carried out by the processor device 150. The actions may be taken in any suitable order, unless indicated otherwise.

In an action S10, it is determined that a first condition is fulfilled, wherein the first condition is fulfilled at least when a downhill condition applies or is about to apply, i.e., when the vehicle 100 is travelling downhill or is about to enter a downhill road section B. Determining that the downhill condition applies or is about to apply may comprise using map data and position information indicative of a current geographic position of the vehicle 100, such as received from a route planning device of the vehicle 100, e.g., the navigation system comprising the satellite navigation device 120. The first condition may also be fulfilled when a vehicle overspeed condition applies, i.e., when the vehicle 100 is travelling at a speed which is higher than a defined vehicle speed, such as higher than an actual set speed, e.g., a speed limit of the road on which the vehicle 100 is travelling.

In an action S11, it is determined if a second condition is fulfilled, wherein the second condition is considered fulfilled if an amount of soot in the particulate filter 113 is determined to exceed a threshold amount, and/or if a temperature $T_{PF}$ at the particulate filter 113 is determined to exceed a temperature threshold level. In other words, it is checked if one or both of two criteria is/are met. In some examples, the second condition is considered fulfilled when either one of the two criteria mentioned above is met. In other examples, the second condition is considered fulfilled when the amount of soot in the particulate filter 113 is determined to exceed a threshold amount, regardless of the temperature $T_{PF}$ at the particulate filter 113. In other examples, both criteria must be met for the second condition to be considered fulfilled. The temperature threshold level and the threshold amount of soot may be set to values at which a risk for soot ignition is at a low level, such as determined by tests.

In an action S12, carried out in response to determining in the actions S10 and S11, respectively, that the first condition is fulfilled, such as when the downhill condition applies or is about to apply, and that the second condition is not fulfilled, the vehicle 100 is controlled to a first operational mode in which the combustion engine 111 is turned off. In the first operational mode, the engine 111 may further be drivingly disconnected from the drive members 115, such as by applying a neutral gear or by disengaging a clutch. No fuel is supplied to the engine 111 in the first operational mode. Hence, the vehicle 100 is allowed to roll down the downhill road section B without operating the engine 100. This is beneficial for maintaining a working temperature of the engine exhaust system 112 and at the same time save fuel when the amount of soot in the particulate filter 113 is relatively low, and/or when the temperature $T_{PF}$ is relatively low.

In an action S13, carried out in response to determining in the actions S10 and S11, respectively, that the first condition is fulfilled and that the second condition is fulfilled, the vehicle 100 is controlled to a second operational mode in which fuel is supplied to the combustion engine 111 and in which the combustion engine 111 is drivingly disconnected from the at least one pair of drive members 115. In other words, the combustion engine 111 is turned on but drivingly disconnected from the drive members 115, such as by applying a neutral gear or by using a clutch to drivingly disconnect the combustion engine 111. In this way, an exhaust gas flow 123 is produced and guided to the particulate filter 113. The exhaust gas mass flow cools the particulate filter 113 and reduces the risk of soot ignition.

In the second operational mode, the combustion engine 111 and/or the engine exhaust system 112 may be controlled to obtain a cooling of the particulate filter 113 by the exhaust gas flow 123 from the combustion engine 111. This may, e.g., be achieved by controlling the temperature and/or mass flow of the exhaust gas flow 123, for example by controlling timing of fuel injection to the engine 111 or by blocking an exhaust gas recirculation (EGR) path, i.e., by controlling one or more valves (not shown) of the engine exhaust system 112. If a variable geometry turbocharger (VGT) is provided, it may be controlled to increase the mass flow m of exhaust gases trough the particulate filter 113. In the second operational mode, the combustion engine 111 may in some examples be controlled to generate a mass flow m of exhaust gas at or above a defined minimum mass flow level.

The actions S12 and S13 are alternative actions, carried out in dependence on an outcome of the determination in the action S11.

The method may further comprise an action S1 in which pressure data from the first and second pressure sensors 121, 122 is received by the processor device 150. The pressure data from the first and second pressure sensors 121, 122 are in the illustrated example indicative of a pressure upstream and downstream of the particulate filter 113, respectively. Pressure data therefrom enables determination of a differential pressure across the particulate filter 113, which may in turn be used to determine the amount of soot within the particulate filter 113. The pressure data may hence be used in the action S11 of determining if the second condition is fulfilled.

The method may further comprise an action S2 in which temperature data from the temperature sensor 119 is received. The temperature data are indicative of the temperature $T_{PF}$ of the particulate filter 113. The received temperature data may be used in the action S11 of determining if the second condition is fulfilled.

Figure 5:
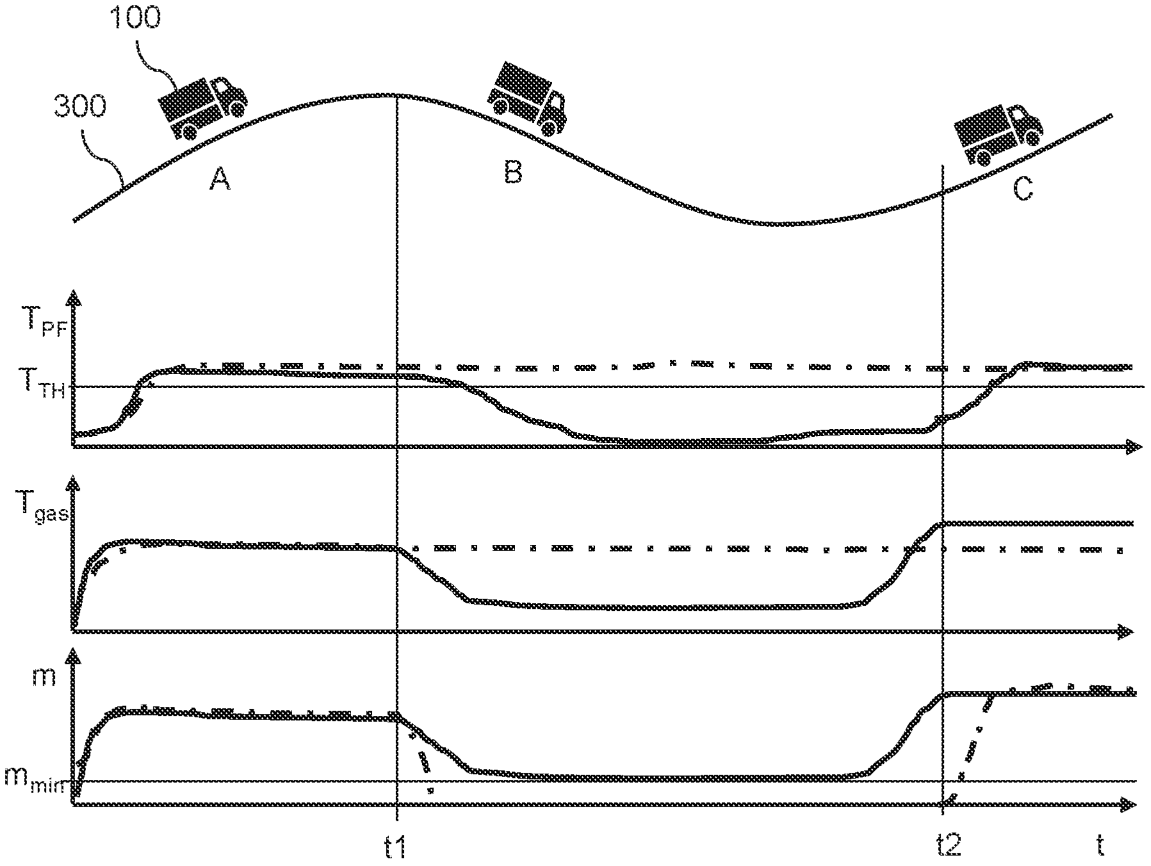
FIG. 5 is a diagram illustrating driving scenarios of a vehicle controlled using an exemplary method.

FIG. 5 illustrates two scenarios in which the vehicle 100 is controlled using a method according to an example of the present disclosure. The vehicle 100 is travelling along a road 300 comprising a first uphill road section A, a downhill road section B, and a second uphill road section C. FIG. 5 further illustrates the temperature $T_{PF}$ of the particulate filter 113, the temperature $T_{gas}$ of the exhaust gases from the engine 111, and the mass flow m of exhaust gases from the engine 111, as a function of time t during travel along the road 300. In the diagrams, the solid lines illustrate a first scenario in which the amount of soot within the particulate filter 113 exceeds the threshold amount, and the dash-dotted lines illustrate a second scenario in which the amount of soot within the particulate filter 113 does not exceed the threshold amount.

When the vehicle 100 is travelling along the first uphill road section A, the engine 111 works at a high load, leading to an elevated temperature of the engine exhaust system 112 and of the particulate filter 113. When the vehicle 100 has reached a crest of the hill, the downhill condition is determined at a time t1 in the action S10, i.e., it is identified that the vehicle 100 enters the downhill road section B and that the first condition is thereby fulfilled. At or before the time t1, it is checked whether the second condition is fulfilled. In the illustrated scenarios, the second condition is considered fulfilled if the amount of soot in the particulate filter 113 exceeds the threshold amount, and if the temperature $T_{PF}$ at the particulate filter 113 exceeds a temperature threshold level $T_{TH}$. In both the first and second scenarios, the temperature $T_{PF}$ exceeds the temperature threshold level $T_{TH}$. However, the second condition is only considered fulfilled in the first scenario, in which the amount of soot in the particulate filter 113 exceeds the threshold amount.

In the first scenario, the vehicle 100 is controlled to the second operational mode at the time t1. Hence, fuel is supplied to the combustion engine 111 and the combustion engine 111 is drivingly disconnected from the at least one pair of drive members 115. The engine 111 and the engine exhaust system 112 are controlled to cool the particulate filter 113 by adjusting operating parameters of the engine 111 and/or the engine exhaust system 112 so that the temperature $T_{gas}$ of the exhaust gases is reduced. The mass flow m of exhaust gases is also reduced since the engine 111 is operated in an idle condition, but a non-zero exhaust gas flow 123 above a minimum mass flow level $m_{min}$ still flows through the particulate filter 113 and cools it down. The temperature $T_{PF}$ of the particulate filter 113 is thereby significantly reduced.

In the second scenario, the vehicle 100 is controlled to the first operational mode at the time t1. Hence, the engine 111 is turned off and drivingly disconnected from the drive members 115, and the exhaust gas flow 123 through the particulate filter 113 is consequently interrupted. Since the particulate filter 113 contains a relatively low amount of soot, the temperature $T_{PF}$ of the particulate filter 113 remains at a desired working temperature during the downhill road section B.

In both of the first and second scenarios, the engine 111 is again drivingly connected to the drive members 115 and controlled to produce a sufficient output torque to drive up the second uphill road section C at the time t2.

Figure 6:
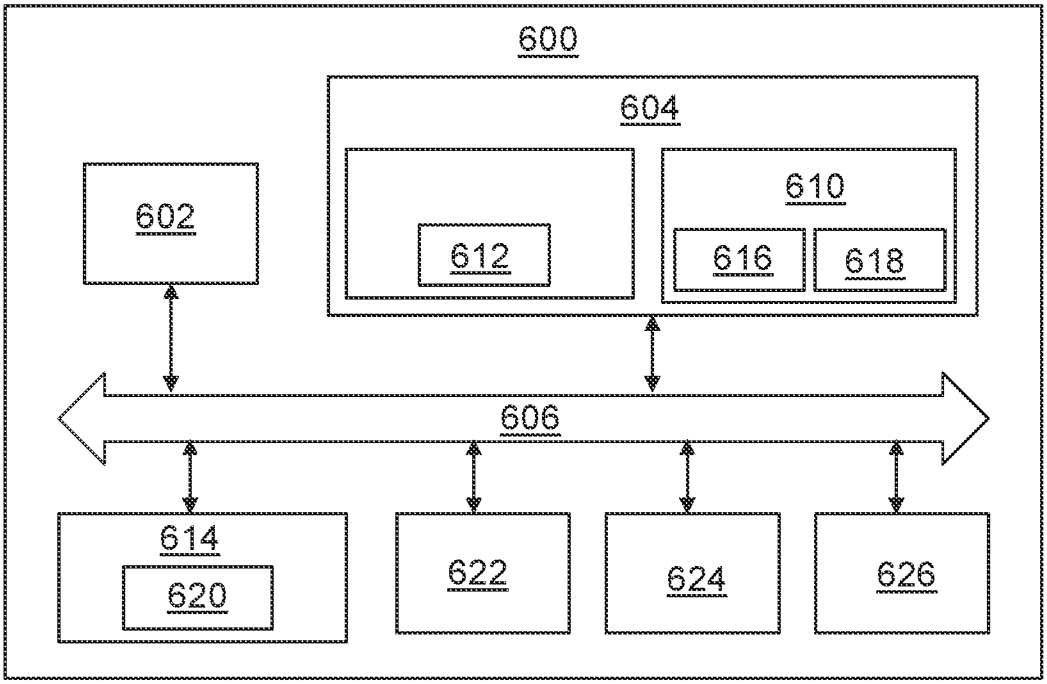
FIG. 6 is a schematic diagram of an exemplary computer system for implementing examples disclosed herein, according to an example.

FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include processing circuitry 602, e.g., processing circuitry including one or more processor devices or control units, a memory 604, and a system bus 606. The computer system 600 may include at least one computing device having the processing circuitry 602. The system bus 606 provides an interface for system components including, but not limited to, the memory 604 and the processing circuitry 602. The processing circuitry 602 may include any number of hardware components for conducting data or signal processing or for executing computer code stored in memory 604. The processing circuitry 602 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 602 may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processing circuitry 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with processing circuitry 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program 620 stored on a transitory or non-transitory computer-usable or computer-readable storage medium (e.g., single medium or multiple media), such as the storage device 614, which includes complex programming instructions (e.g., complex computer-readable program code) to cause the processing circuitry 602 to carry out actions described herein. Thus, the computer-readable program code of the computer program 620 can comprise software instructions for implementing the functionality of the examples described herein when executed by the processing circuitry 602. In some examples, the storage device 614 may be a computer program product (e.g., readable storage medium) storing the computer program 620 thereon, where at least a portion of a computer program 620 may be loadable (e.g., into a processor) for implementing the functionality of the examples described herein when executed by the processing circuitry 602. The processing circuitry 602 may serve as a controller or control system for the computer system 600 that is to implement the functionality described herein.

The computer system 600 may include an input device interface 622 configured to receive input and selections to be communicated to the computer system 600 when executing instructions, such as from a keyboard, mouse, touch-sensitive surface, etc. Such input devices may be connected to the processing circuitry 602 through the input device interface 622 coupled to the system bus 606 but can be connected through other interfaces, such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may include a communications interface 626 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Examples of the present disclosure are listed in the following.

Example 1: A computer system (600) comprising a processor device (150, 602) configured to control a vehicle (100), the vehicle (100) comprising a combustion engine (111), at least one pair of drive members (115) drivingly connectable to the combustion engine (100) for driving the vehicle (100), and an engine exhaust system (112) comprising a particulate filter (113), the processor device (150, 602) being configured to:

- determine that a first condition is fulfilled, wherein the first condition is fulfilled at least when a downhill condition applies or is about to apply,
- determine if a second condition is fulfilled, wherein the second condition is considered fulfilled if an amount of soot in the particulate filter (113) is determined to exceed a threshold amount, and/or if a temperature ($T_{PF}$) at the particulate filter (113) is determined to exceed a temperature threshold level ($T_{TH}$),
- in response to determining that the first condition is fulfilled and that the second condition is not fulfilled, control the vehicle (100) to a first operational mode in which the combustion engine (111) is turned off,
- in response to determining that the first condition is fulfilled and that the second condition is fulfilled, control the vehicle (100) to a second operational mode in which fuel is supplied to the combustion engine (111) and in which the combustion engine (111) is drivingly disconnected from the at least one pair of drive members (115).

Example 2: The system according to example 1, wherein, in the second operational mode, the combustion engine (111) and/or the engine exhaust system (112) is/are controlled to obtain a cooling of the particulate filter (113) by an exhaust gas flow from the combustion engine (111).

Example 3: The system according to example 1 or 2, wherein, in the second operational mode, the combustion engine (111) is controlled to generate a mass flow (m) of exhaust gas at or above a defined minimum mass flow level ($m_{min}$).

Example 4: The system according to any one of examples 1-3, further being configured to receive pressure data from at least one pressure sensor (121, 122) configured to measure a pressure within the engine exhaust system (112), said pressure data being indicative of a pressure upstream and/or downstream of the particulate filter (113).

Example 5: The system according to example 4, wherein the processor device is configured to determine if the amount of soot exceeds the threshold amount by using the received pressure data.

Example 6: The system according to any one of examples 1-5, further being configured to receive temperature data from at least one temperature sensor (119) configured to measure a temperature within the engine exhaust system (112), said temperature data being indicative of a temperature ($T_{PF}$) of the particulate filter (113).

Example 7: The system according to example 6, wherein the processor device is configured to determine if the temperature ($T_{PF}$) at the particulate filter (113) exceeds the temperature threshold level by using the received temperature data.

Example 8: The system according to any one of examples 1-7, wherein the processor device is configured to determine that the downhill condition applies or is about to apply by using map data and position information indicative of a current geographic position of the vehicle (100), such as received from a route planning device of the vehicle (100).

Example 9: The system according to any one of examples 1-8, wherein the second condition is only considered fulfilled when the amount of soot in the particulate filter (113) is determined to exceed the threshold amount, and when the temperature ($T_{PF}$) at the particulate filter (113) is determined to exceed the temperature threshold level ($T_{TH}$).

Example 10: The system according to any one of examples 1-9, wherein the first condition is considered fulfilled when a vehicle overspeed condition of the vehicle (100) applies.

Example 11: A computer-implemented method for controlling a vehicle (100) comprising a combustion engine (111), at least one pair of drive members (115) drivingly connectable to the combustion engine (111) for driving the vehicle, and an engine exhaust system (112) comprising a particulate filter (113), the method comprising:

- determining (S10), by a processor device (150, 602) of a computer system (600), that a first condition is fulfilled, wherein the first condition is fulfilled at least when a downhill condition applies or is about to apply,
- determining (S11), by the processor device (150, 602), if a second condition is fulfilled, wherein the second condition is considered fulfilled if an amount of soot in the particulate filter (113) is determined to exceed a threshold amount, and/or if a temperature ($T_{PF}$) at the particulate filter (113) is determined to exceed a temperature threshold level ($T_{TH}$),
- in response to determining that the first condition is fulfilled and that the second condition is not fulfilled, controlling (S12), by the processor device (150, 602), the vehicle (100) to a first operational mode in which the combustion engine (111) is turned off,
- in response to determining that the first condition is fulfilled and that the second condition is fulfilled, controlling (S13), by the processor device (150, 602), the vehicle (100) to a second operational mode in which fuel is supplied to the combustion engine (111)

and in which the combustion engine (111) is drivingly disconnected from the at least one pair of drive members (115).

Example 12: The method according to example 11, wherein, in the second operational mode, the combustion engine (111) and/or the engine exhaust system (112) is/are controlled to obtain a cooling of the particulate filter (113) by an exhaust gas flow from the combustion engine (111).

Example 13: The method according to example 11 or 12, wherein, in the second operational mode, the combustion engine (111) is controlled to generate a mass flow (m) of exhaust gas at or above a defined minimum mass flow level ($m_{min}$).

Example 14: The method according to any one of examples 11-13, further comprising, in the processor device, receiving (S1) pressure data from at least one pressure sensor (121, 122) configured to measure a pressure within the engine exhaust system (112), said pressure data being indicative of a pressure upstream and/or downstream of the particulate filter (113).

Example 15: The method according to example 14, wherein determining if the amount of soot exceeds the threshold amount comprises using the received pressure data.

Example 16: The method according to any one of examples 11-15, further comprising, in the processor device (150, 602), receiving (S2) temperature data from at least one temperature sensor (119) configured to measure a temperature within the engine exhaust system (112), said temperature data being indicative of a temperature ($T_{PF}$) of the particulate filter (113).

Example 17: The method according to example 16, wherein determining if the temperature ($T_{PF}$) at the particulate filter (113) exceeds the temperature threshold level comprises using the received temperature data.

Example 18: The method according to any one of examples 11-17, wherein determining that the downhill condition applies or is about to apply comprises using map data and position information indicative of a current geographic position of the vehicle (100), such as received from a route planning device of the vehicle (100).

Example 19: The method according to any one of examples 11-18, wherein the second condition is only considered fulfilled when the amount of soot in the particulate filter (113) is determined to exceed the threshold amount, and when the temperature ($T_{PF}$) at the particulate filter (113) is determined to exceed the temperature threshold level ($T_{TH}$).

Example 20: The method according to any one of examples 11-19, wherein the first condition is considered fulfilled when a vehicle overspeed condition of the vehicle (100) applies.

Example 21: A vehicle (100) comprising the processor device (150, 602) configured to perform the method of any one of examples 11-20.

Example 22: A computer program product (620) comprising program code for performing, when executed by the processor device (150, 602), the method of any one of examples 11-20.

Example 23: A control system (600) comprising one or more control units (150, 602) configured to perform the method of any one of examples 11-20.

Example 24: A non-transitory computer-readable storage medium (614) comprising instructions, which when executed by the processor device (150, 602), cause the processor device (150, 602) to perform the method of any one of examples 11-20.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising a processor device configured to control a vehicle, the vehicle comprising a combustion engine, at least one pair of drive members drivingly connectable to the combustion engine for driving the vehicle, and an engine exhaust system comprising a particulate filter, the processor device being configured to:

determine that a first condition is fulfilled, wherein the first condition is fulfilled at least when a downhill condition applies or is about to apply, determine if a second condition is fulfilled, wherein the second condition is considered fulfilled if an amount of soot in the particulate filter is determined to exceed a threshold amount, and/or if a temperature at the particulate filter is determined to exceed a temperature threshold level, in response to determining that the first condition is fulfilled and that the second condition is not fulfilled, control the vehicle to a first operational mode in which the combustion engine is turned off, in response to determining that the first condition is fulfilled and that the second condition is fulfilled, control the vehicle to a second operational mode in which fuel is supplied to the combustion engine and in which the combustion engine is drivingly disconnected from the at least one pair of drive members.

2. A computer-implemented method for controlling a vehicle comprising a combustion engine, at least one pair of drive members drivingly connectable to the combustion engine for driving the vehicle, and an engine exhaust system comprising a particulate filter, the method comprising:

determining, by a processor device of a computer system, that a first condition is fulfilled, wherein the first condition is fulfilled at least when a downhill condition applies or is about to apply, determining, by the processor device, if a second condition is fulfilled, wherein the second condition is considered fulfilled if an amount of soot in the particulate filter is determined to exceed a threshold amount, and/or if a temperature at the particulate filter is determined to exceed a temperature threshold level, in response to determining that the first condition is fulfilled and that the second condition is not fulfilled, controlling, by the processor device, the vehicle to a first operational mode in which the combustion engine is turned off, in response to determining that the first condition is fulfilled and that the second condition is fulfilled, controlling, by the processor device, the vehicle to a second operational mode in which fuel is supplied to the combustion engine and in which the combustion engine is drivingly disconnected from the at least one pair of drive members.

3. The method according to claim 2, wherein, in the second operational mode, the combustion engine and/or the engine exhaust system is/are controlled to obtain a cooling of the particulate filter by an exhaust gas flow from the combustion engine.

4. The method according to claim 2, wherein, in the second operational mode, the combustion engine is controlled to generate a mass flow of exhaust gas at or above a defined minimum mass flow level.

5. The method according to claim 2, further comprising, in the processor device, receiving pressure data from at least one pressure sensor configured to measure a pressure within the engine exhaust system, said pressure data being indicative of a pressure upstream and/or downstream of the particulate filter.

6. The method according to claim 5, wherein determining if the amount of soot exceeds the threshold amount comprises using the received pressure data.

7. The method according to claim 2, further comprising, in the processor device, receiving temperature data from at least one temperature sensor configured to measure a temperature within the engine exhaust system, said temperature data being indicative of a temperature of the particulate filter.

8. The method according to claim 7, wherein determining if the temperature at the particulate filter exceeds the temperature threshold level comprises using the received temperature data.

9. The method according to claim 2, wherein determining that the downhill condition applies or is about to apply comprises using map data and position information indicative of a current geographic position of the vehicle, such as received from a route planning device of the vehicle.

10. The method according to claim 2, wherein the second condition is only considered fulfilled when the amount of soot in the particulate filter is determined to exceed the threshold amount, and when the temperature at the particulate filter is determined to exceed the temperature threshold level.

11. The method according to claim 2, wherein the first condition is considered fulfilled when a vehicle overspeed condition of the vehicle applies.

12. A vehicle comprising the processor device configured to perform the method of claim 2.

13. A computer program product comprising program code for performing, when executed by the processor device, the method of claim 2.

14. A control system comprising one or more control units configured to perform the method of claim 2.

15. A non-transitory computer-readable storage medium comprising instructions, which when executed by the processor device, cause the processor device to perform the method of claim 2.

* * * * *